Nov. 18, 1969    W. W. RIGROD    3,479,620
LASER WITH SERIALLY COUPLED MODE SELECTING RESONATOR SECTIONS
Filed March 16, 1966    3 Sheets-Sheet 1

INVENTOR
W. W. RIGROD
BY
Wilford L. Wisner
ATTORNEY

Nov. 18, 1969   W. W. RIGROD   3,479,620
LASER WITH SERIALLY COUPLED MODE SELECTING RESONATOR SECTIONS
Filed March 16, 1966   3 Sheets-Sheet 2

$L_1 = L_{1A} + L_{1B} + L_{1C}$ $L_2 = L_{2A} + L_{2B} + L_{2C}$

United States Patent Office 3,479,620
Patented Nov. 18, 1969

1

3,479,620
LASER WITH SERIALLY COUPLED MODE
SELECTING RESONATOR SECTIONS
William W. Rigrod, Millington, N.J., assignor to Bell Telephone Laboratories, Incorporated, New York, N.Y., a corporation of New York
Filed Mar. 16, 1966, Ser. No. 534,816
Int. Cl. H01s 3/08, 3/09
U.S. Cl. 331—94.5      7 Claims

ABSTRACT OF THE DISCLOSURE

The laser disclosed employs a mode-selecting resonator having serially coupled resonant portions in which a plurality of sections of the active medium are disposed. The resonator portions are adapted to have coincident resonant frequencies that are separated by more than the oscillation bandwidth of any resonator portion in combination with its section of active medium. The intermediate reflector or reflectors preferably have transmittances that are between 40 percent and 60 percent. Each resonator portion and its included section of active medium supports oscillation only very weakly, or not at all, at frequencies not shared in common by the other combinations of resonator portions and active media.

This invention relates to mode selection in laser resonators.

The term "laser" is an acronym for light amplification by the stimulated emission of radiation. A laser typically includes an active medium that has a pair of energy levels between which the lasing action occurs. The frequency of stimulated radiation corresponding to this pair of levels lies within a band called the line width of the transition, which is partially determined by Doppler broadening. A laser oscillator further includes a resonator formed by a pair of reflecting elements spaced apart so that at least one frequency lying in the line width can be resonated in the resonator.

In order to obtain oscillations with a generally useful output power level, the length of active material and its gain coefficient typically must be so great that the smallest possible spacing of the reflecting elements still permits oscillations at a plurality of frequencies within the line width. The frequencies correspond to different axial modes of oscillation. Nevertheless, the power output at any one frequency generally can be greatest and most useful when oscillation occurs only at that one frequency.

Therefore, it is advantageous to select a particular frequency or axial mode that is permitted to oscillate.

Many different techniques have been proposed for axial mode selection. Among these are the addition of reflectors outside the primary resonator to increase the losses for all modes except one. In order to achieve this result, such techniques also tend to provide an undesirably high attenuation for the desired mode, and do not always provide sufficient discrimination against undesired modes.

Another technique for axial mode selection involves the employment of a three-legged or split-beam resonator, such as that disclosed by M. DiDomenico et al. in their copending patent application, Serial No. 490,985, filed Sept. 28, 1965, now Patent No. 3,414,840, and assigned to the assignee hereof. In that resonator, two sections of the active medium appear in different resonant portions of the resonator, those portions having coincident resonant frequencies that are separated by more than the oscillation bandwidth of each resonator portion in combination with its section of active medium. Since the two resonant portions of the resonator are coupled in parallel with respect to the beam-splitting surface, in the sense that there is at least a partial overlap of the two portions, the maintenance of identical beam diameter and wave-front curvature in the common leg, or overlap region, of the interferometer is critical to the desired interference effects. Assuming the two beams are of equal intensity, their waists should intersect symmetrically at the intersection of their optic axes. Accordingly, the three-legged resonator is somewhat difficult to fabricate, to adjust, and to be kept stable.

It is an object of my invention to provide an arrangement for laser mode selection that is effective and easy to fabricate and adjust, in addition to permitting use of two or more lasers for higher single-frequency power.

My invention resides in my recognition that effective mode selection can be provided in a laser having a plurality of sections of active medium by providing a resonator having serially coupled resonant portions encompassing respective sections of the active medium. The two resonant portions are serially coupled in the sense that they have no region of overlap. The resonator portions are adapted to have coincident resonant frequencies that are separated by more than the oscillation bandwidth of either resonator portion in combination with its section of active medium. Typically, the portions of the resonator are coupled serially by a partially transmissive reflective element conforming to an equiphase surface that is characteristic of the composite resonator. The partially transmissive reflector has a transmittance between 40 percent and 60 percent, which is sufficiently large that each resonator portion in combination with its section of active medium oscillates only very weakly, or not at all, at frequencies not shared in common with the other resonator portions in combination with their respective sections of active medium.

Advantageously, all of the sections of the active medium and the reflective elements may have the same straight-line axis. It is easier to maintain stability in such an arrangement than in a three-legged resonator or other multiple-axis arrangement. Further, the wave interference between the resonator portions, upon which mode discrimination depends, is more easily maintained over the surface of the partially transmissive reflective element when there is no overlap of the two resonant portions of the resonator than when there is. Still further, the partially transmissive element can have a greater variety of positions along the laser axis than in a laser having partial overlap of the two resonant portions of the resonator.

While simple configurations are thus made possible, more complex configurations may also employ the principles of the invention. For example, two or more active ring lasers can be coupled serially to provide the vernier mode selection of the present invention; and this arrangement is clearly not a straight-line arrangement. Even so, stability is improved; and no overlap of the resonant portions of the resonator occurs.

Other features and advantages of the present invention will become apparent from the following detailed description, in conjunction with the drawing, in which.

Figure 1:
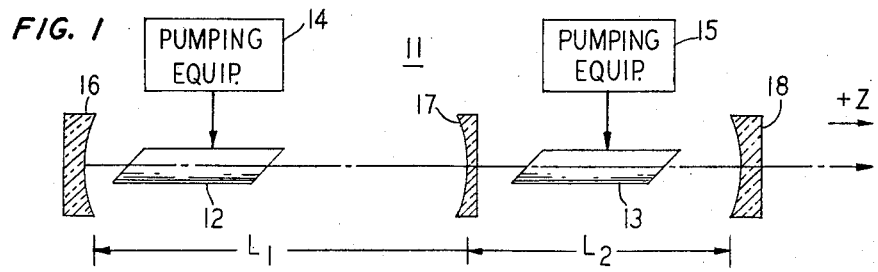
FIG. 1 is a partially pictorial and partially block diagrammatic illustration of a preferred embodiment of the invention.

In FIG. 1 a laser 11 includes the sections 12 and 13 of an active medium, for example, glass tubes having Brewster-angle end windows and containing a gas capable of the stimulated emission of radiation, apparatus 14 and 15 for pumping the respective sections of active medium to enable the stimulated emission of radiation, and a resonator comprising a first resonant portion including the reflective elements 16 and 17 and a second resonant portion including the reflective elements 17 and 18. The reflective element 17 is partially transmissive and conforms to an equiphase surface characteristic of the resonator; that is, it conforms to a wavefront of the resonator mode that is supportable by reflectors 16 and 18; reflective element 18 is partially transmissive to permit the abstraction of an output from the laser.

The active gas in the sections 12 and 13 is illustratively ionized argon; and the pumping equipments 14 and 15 include sources of direct-current voltages and means for applying the direct-current voltages to sections 12 and and 13, respectively, in order to maintain the argon ionized and to populate selectively the upper laser level of the ionized argon for laser action at a wavelength of about 0.5 micron. Further details of the structure, such as may be employed for high power operation, are disclosed in the copending application of E. I. Gordon et al., Serial No. 439,657, filed March 15, 1965, and assigned to the assignee hereof. Illustratively, sections 12 and 13 both have approximately equal length $l_1$ and $l_2$, for example, 100 centimeters, and have nearly equal gains $g_1 l_1$ and $g_2 l_2$, respectively, where $g_1$ or $g_2$ is the respective gain per unit length.

Reflectors 16–18 are illustratively fused quartz that is coated with multiple layers of dielectric material, such as alternate layers of cerium fluoride and cryolite, to the desired degree of reflectance in the desired wavelength range. Reflector 16 is opaque (reflectivity near 100 percent), while reflector 17 has a reflectance of approximately 50 percent and reflector 18 has a reflectance near 98 percent. Thus, the reflector 17 has a transmittance $t_2$ that is nearly 50 percent. A relatively large value of $t_2$, preferably between 40 percent and 60 percent, is important to the present invention.

Illustratively, reflector 17 is disposed slightly closer (about one centimeter for argon or about five centimeters for a helium-neon mixture) operated at 6328 A. to reflector 18 than to the reflector 16, so that the resonant frequencies of the resonator portion encompassing the active medium section 13 are separated more than are the resonant frequencies of the resonator portion encompassing the active medium section 12. Assuming the left-hand surface of reflector 17 is the intended reflective surface, the displacement of that surface from a central position between reflectors 16 and 18 can be very small. The right-hand surface of reflector 17 is antireflection coated with a dielectric material suitable for the $0.5\mu$ radiation from ionized argon.

Illustratively, reflectors 16 and 18 are near confocal and have equal radii of curvature so that the beam waist is formed midway between them. Thus, the reflective surface of reflector 17 is displaced from the beam waist and must be curved slightly, concave and facing toward the more distant reflector, in order to conform to an equiphase surface characteristic of the composite resonator. An equiphase surface characteristic of the resonator is that locus of points defining a wavefront, or constant phase portion, of the coherent radiation wave being resonated in both resonator portions and the composite resonator. In general, reflectors 16 and 18 may have unequal radii of curvature. Alternatively, they can be spaced exactly confocally, so that the oscillating mode automatically adapts itself to form a wavefront coinciding with reflector 17 for a wide range of curvatures and positions of reflector 17, due to the degeneracy of the exact confocal resonator.

Figure 2:
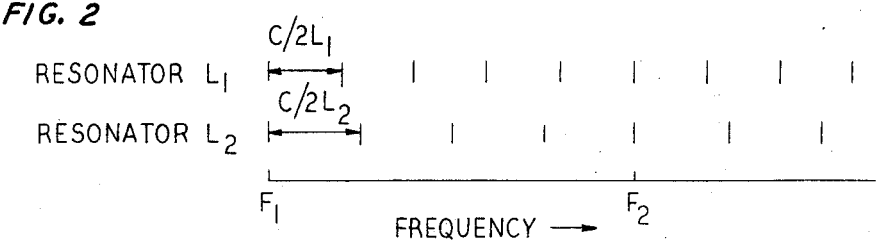
FIG. 2 shows a graph that is representative of resonant frequency spacings for the two portions of the resonator of FIG. 1.

The operation of the embodiment of FIG. 1 is as follows. The resonator portion comprising reflectors 16 and 17 is a resonant at axial modes spaced in frequency by $C/2L_1$ (as shown in the upper graph of FIG. 2); and the resonator portion comprising reflectors 17 and 18 is resonant at axial modes spaced in frequency by $C/2L_2$ (as shown in the lower graph of FIG. 2). Thus, the reflector 17 makes the resonator portions to be of unequal optical length. Further, the spacing of reflectors is selected so that the respective sets of resonant axial modes coincide in frequency periodically. For the purpose of simplicity in illustration, the coincident frequencies are shown to the frequencies $F_1$ and $F_2$ in FIG. 2 that are separated by a few axial modes of each resonator portion. Ordinarily $F_1$ and $F_2$ would be separated by many axial modes.

Figure 3:
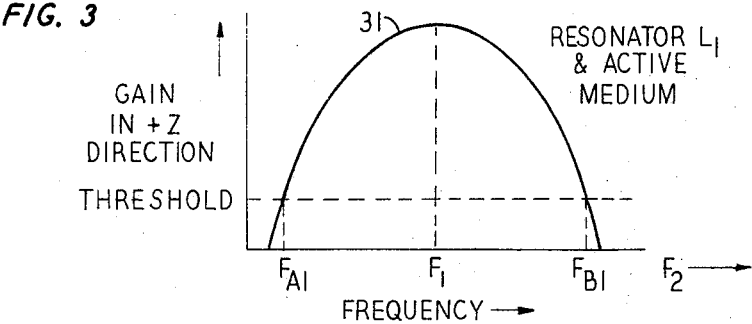
FIGS. 3 and 4 show curves indicating the oscillation bandwidths of the resonator portions in combination with their respective sections of active medium.
Figure 4:
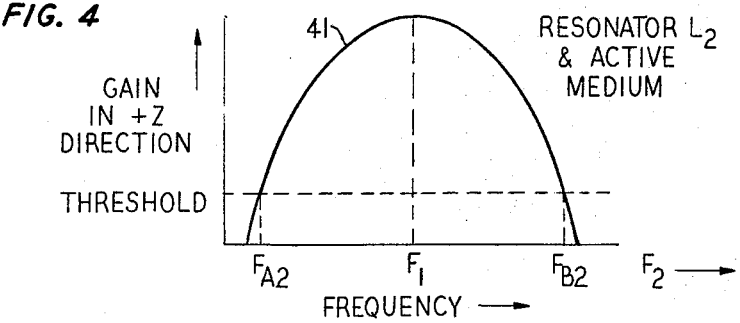

The frequencies $F_1$ and $F_2$ of the successive coincident resonant axial modes are arranged to be separated by more than the oscillation bandwidth of either resonator portion in combination with its section of active medium. The oscillation bandwidth of section 12 and its encompassing resonator portion is represented in curve 31 of FIG. 3 as $F_{B_1} - F_{A_1}$. Similarly, the oscillation bandwidth of section 13 and its encompassing resonator portion is represented in curve 41 of FIG. 4 as $F_{B_2} - F_{A_2}$. The frequencies $F_{B_1}$ and $F_{A_1}$ and the frequencies $F_{B_2}$ and $F_{A_2}$ occur at intersections of the respective gain curves with the respective oscillation thresholds. It is a characteristic of the present invention that $F_2 - F_1$ is arranged to be greater than either $F_{B_2} - F_{A_2}$ or $F_{B_1} - F_{A_1}$. In the illustrative embodiments, $F_{B_2} = F_{B_1}$ and $F_{A_2} = F_{A_1}$, although these relationships are not required.

The transmission $t_2$ of reflector 17 is sufficiently large that the resonator portions oscillate only very weakly, or not at all, at frequencies not shared in common. Waves from one portion readily enter the other and, when not resonant in such other, decay there without regeneration.

In contrast, when the reflector positions are adjusted so that one of the coincident frequencies, e.g., $F_1$ or $F_2$, is near the center of both gain profiles (or at least is at a point on both profiles above the oscillation threshold), the composite resonator, of length $L_1 + L_2$, will also resonate at that frequency. Since its losses are very small, its internal energy will build up in both resonator portions to a high level. Under these conditions, the reflector 17 presents a very high reflectance to each resonator portion, as the reflected wave is reinforced by radiation at the same frequency from the adjoining resonator. The mode discrimination mechanism of two active coupled resonators is considerably sharper than that between one active and one passive resonator.

Further, in contrast to the prior art mode-selecting resonators in which only one section of active medium is provided, one resonator portion does not drain the energy of the oscillating mode from the other portion, inasmuch as the field intensities are virtually the same in both portions.

The operation of the present invention may be restated more particularly as follows. Discrimination against the axial modes of the respective resonator portions, when those modes do not coincide in frequency with resonant modes of the other portion, is provided by the relatively large transmittance $t_2$ coupling the two resonator portions, which assures each a low Q for such frequencies. On the other hand, in the case of axial modes resonant in the two portions at a coincident frequency, the adjustment of the portions is such that the nearly equal intensities therein provide nearly complete interference at the reflective surface of reflector 17. This complete interference provides both resonator portions with a very high Q for oscillations at the coincident frequency.

Various modifications of the arrangement of FIG. 1 can be made. For example, the two resonator portions can depart substantially from nearly equal length, e.g., by moving reflector 17, so long as the curvature of reflector 17 is conformed to an equiphase surface (generally more curved than before) and at least one coincident resonant frequency occurs above the oscillation thresholds on both gain profiles.

Figure 5:
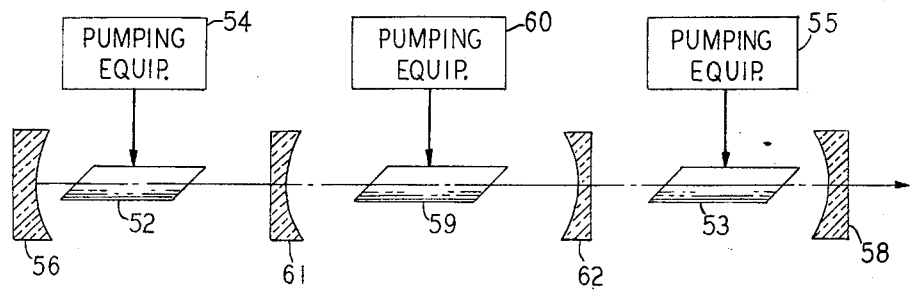
FIG. 5 is a partially pictorial and partially block diagrammatic illustration of a modification of the embodiment of FIG. 1.

Further, more than two resonator portions and sections of active medium can be employed in a laser according to the present invention, in order to achieve still higher power at a single frequency. Such a modified embodiment is shown in FIG. 5, components corresponding to like components in FIG. 1 being designated with numerals forty (40) digits higher than in FIG. 1. In this case, however, a third laser section 59, pumped by suitable means 60, is introduced between the 50 percent transmissive reflectors 61 and 62, which conform to equiphase surfaces of the composite resonator. The section 59 is similar to sections 52 and 53 and provides nearly the same gain; and pumping equipment 60 is like pumping equipments 54 and 55.

In the embodiment of FIG. 5, a triple coincidence of resonant frequencies of the three resonator portions, above the oscillation thresholds of all three, is required in order for all three resonator portions to support oscillations with effectively high Q's. The triple coincidence reduces the chances that more than one mode can oscillate even within very wide oscillation bandwidths. The principles of operation are the same as described above for the embodiment of FIG. 1. In general, the transmissivities of the reflectors 61 and 62 preferably lie between 40 percent and 60 percent.

Figure 6:
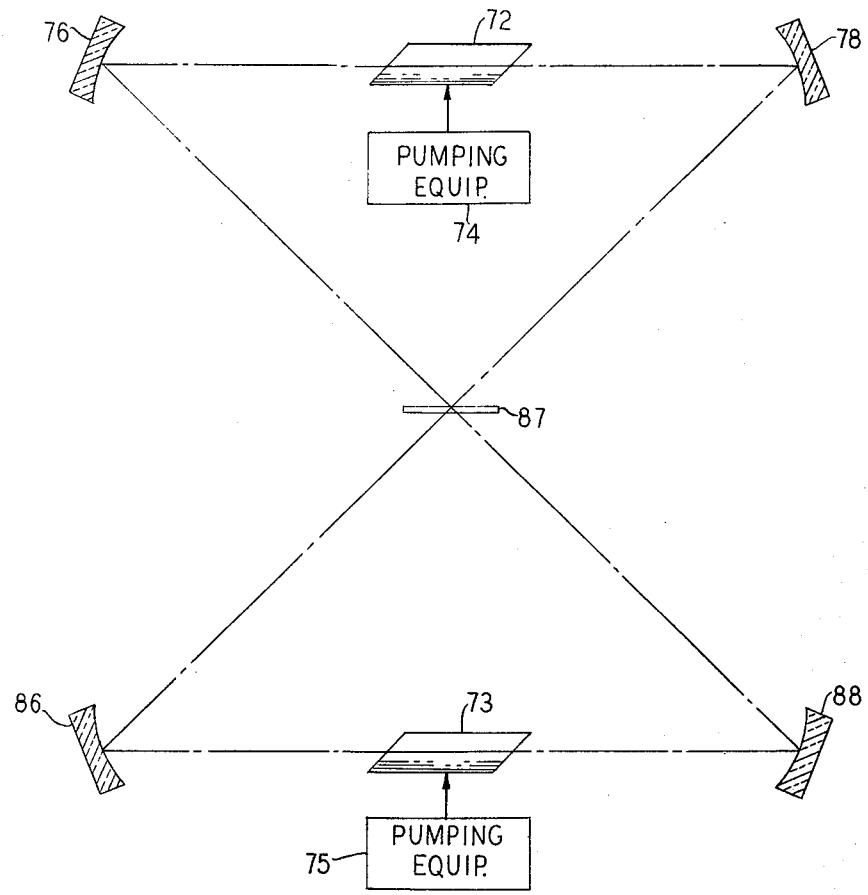
FIG. 6 is a partially pictorial and partially block diagrammatic illustration of another embodiment of the invention including a plurality of ring lasers.

Another embodiment of the invention as applied to ring lasers is shown in FIG. 6. Components similar to components of FIG. 1 are designated with numerals sixty (60) digits higher than in FIG. 1. Reflectors 86 and 88 are similar to reflectors 76. The 50 percent transmissive reflector 87 serially couples the two triangular ring resonators, 76, 78, 87 and 86, 88, 87, respectively, to form one composite ring resonator. In this instance, the reflector 87 is not conformed to an equiphase surface of the composite resonator inasmuch as the crossing portions of the oscillating mode would impose inconsistent requirements thereon. Nevertheless, it is possible to devise a ring resonator that employs the principles of the present invention and also employs transmissive reflectors conforming to equiphase surfaces, as will be discussed below in connection with FIG. 7.

In operation, the two triangular ring resonators of FIG. 6 are adjusted so that they have resonant axial modes at a coincident frequency suitable for oscillation in both. The nearly equal intensities in both ring resonators at that coincident resonant frequency provide that both ring resonators have higher Q's at that frequency than at other frequencies for which resonance occurs in only one. Thus, the principle of nearly equal intensities in serially coupled resonator portions is maintained.

Figure 7:
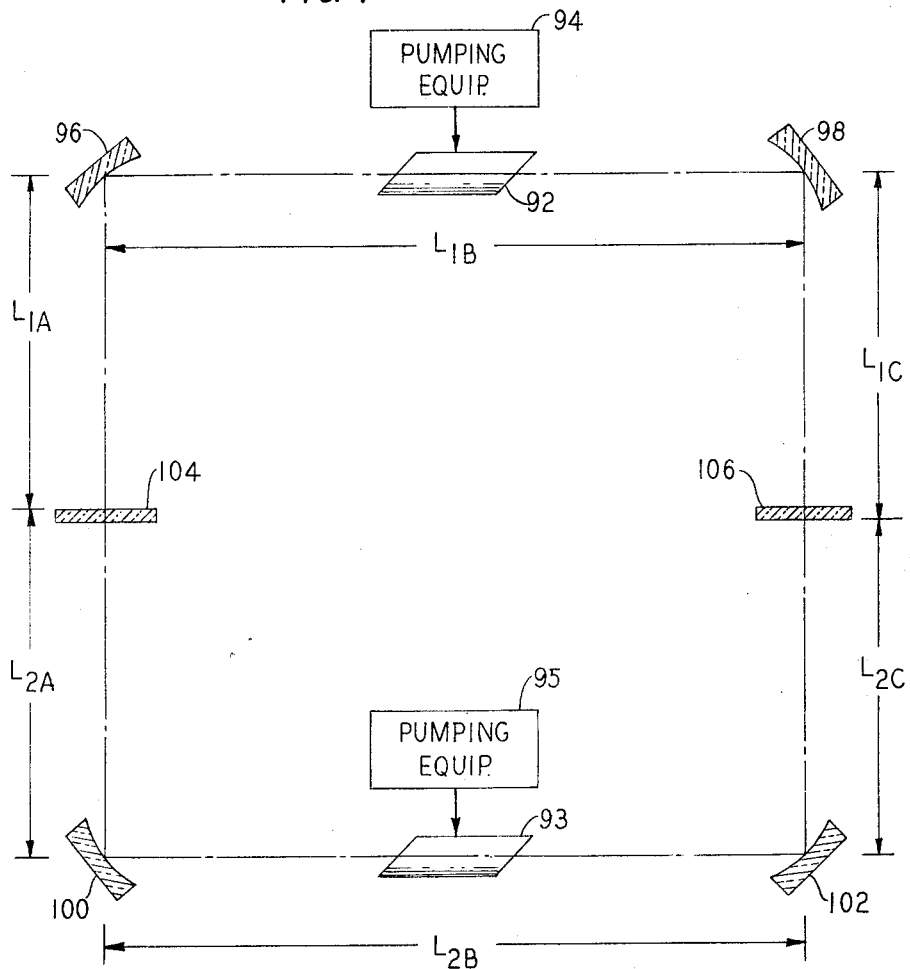
FIG. 7 is a partially pictorial and partially block diagrammatic illustration of another embodiment of the invention in which a ring laser is formed from two lasers that are not ring lasers.

FIG. 7 illustrates a modified embodiment of the invention in which a ring resonator is formed by a pair of resonators which are not themselves ring resonators.

The first resonator is defined by the partially transmissive (40 percent to 60 percent) reflectors 104 and 106 as its end members and encloses the corner reflectors 96 and 98, the tube 92 containing the active medium, with which is associated the equipment 94 for pumping the active medium to enable the stimulated emission of radiation. This resonator has length $L_1$, which is the sum of the three leg lengths $L_{1A}$, $L_{1B}$ and $L_{1C}$, as indicated. The total length $L_1$ is analogous to the length $L_1$ in FIG. 1.

The second resonator is defined by the reflectors 104 and 106 as its end members and encloses the corner reflectors 100 and 102, the tube 93 containing additional active medium, with which is associated the equipment 95 for pumping the active medium to enable the stimulated emission of radiation. This resonator has length $L_2$, which is the sum of the three leg lengths $L_{2A}$, $L_{2B}$ and $L_{2C}$, as indicated. The total length $L_2$ is analogous to the length $L_2$ in FIG. 1. $L_2$ is slightly smaller than $L_1$, as in the embodiment of FIG. 1.

The corner reflectors 96, 100 and 102 are highly reflective; and reflector 98 is illustratively made about two per cent transmissive in order to permit the abstration of an output from the laser. The tubes 92 and 93, their active media and the pumping equipments are like those disclosed above for the embodiment of FIG. 1.

In operation, the partially transmissive reflectors 104 and 106 serially couple the two U-shaped resonators of lengths $L_1$ and $L_2$ to form one composite ring resonator. The two resonators have coincident resonant frequencies separated by more than the oscillation bandwidth of either resonator in combination with its section of active medium, as in the embodiment of FIG. 1. The details of operation are essentially the same as for the preceding embodiments of the invention. Very sharp discrimination is provided between the mode of frequency resonant in both resonators, so that nearly equal intensities build up in both resonators, and other modes of frequencies which are not resonant in both resonators, so that each resonator is drained of the energy of its noncoincident resonant frequencies by the other resonator.

Two contrasts can be made between the embodiments of FIG. 6 and 7. First, the partially transmissive reflectors 104 and 106 in FIG. 7 can be, and preferably are, closely conformed to equiphase surfaces of the composite resonator; whereas the transmissive reflector 87 in FIG. 6 can not be. The embodiment of FIG. 7 advantageously fixes the phase of the oscillation in space, whereas that of FIG. 6 does not. Second, unidirectional traveling oscillations can occur in the embodiment of FIG. 6 whenever the active medium (such as ionized argon) provides differing gain characteristics in the two directions; whereas unidirectional tranveling wave oscillations cannot occur in the embodiment of FIG. 7. For the latter reason, for some applications the embodiment of FIG. 6 is preferred over the embodiment of FIG. 7.

Still other modifications of the disclosed embodiments can be made. For example, the principles of the embodiment of FIG. 6 can be extended to couple serially three or more ring resonators, each of different length, to achieve increased power output of a single mode. Such an arrangement will have increased separation of the coincident resonant frequencies of the different ring resonators. The principles of the embodiment of FIG. 7 can also be extended to more than two resonator portions.

In all cases, the above-described arrangements are illustrative of the many possible specific embodiments that can represent applications of the principles of the invention. Numerous and varied other arrangements can be devised in accordance with these principles by those skilled in the art without departing from the spirit and scope of the invention.

What is claimed is:

1. A laser comprising a plurality of sections of active medium capable of lasing action, means for pumping said section to promote said lasing action, and an optical resonator comprising a plurality of portions each encompassing one of said sections said resonator portions including at least one partially transmissive reflector serially coupling said portions, said resonator portions having respectively different lengths providing for said coupled portions coincident resonant frequencies that are separated by more than the oscillation bandwidth of any of said portions in combination with its section of active medium.

2. A laser according to claim 1 in which the coupling means comprises a partially transmissive reflective element conforming to an equiphase surface that is characteristic of said optical resonator, said reflective element being disposed to make the resonator portions of unequal optical length and having a transmissivity between 40 percent and 60 percent.

3. A laser according to claim 2 in which the sections of active medium provide substantially equal gains, so that substantially equal intensities of radiation build up in the resonator portions at the coincident resonant frequency.

4. A laser according to claim 1 in which the plurality of resonator portions are aligned along a common straight-line axis.

5. A laser according to claim 1 in which the plurality of resonator portions comprises a plurality of ring resonators.

6. A laster according to claim 1 in which the sections of active medium and coupling means are mutually adapted to provide nearly peak gains for the coincident resonant frequency in a plurality of the resonator portions in combination with the respective ones of said sections of active medium and to make said gains substantially equal.

7. A laser according to claim 1 in which the plurality of resonating portions form a ring resonator.

References Cited

Birnbaum et al. J. Appl. Phys., vol. 34, November 1963, pp. 3414, 3415.

DiDomenico, Appl. Phys. Letters, vol. 8, Jan. 1, 1966, pp. 20–22.

Pratesi et al. II Nuovo Cimento, vol. 34, Oct. 1, 1964, pp. 40–50.

ROY LAKE, Primary Examiner

SIEGFRIED H. GRIMM, Assistant Examiner